(12) United States Patent
Lee

(10) Patent No.: US 7,038,751 B2
(45) Date of Patent: May 2, 2006

(54) LIQUID CRYSTAL DISPLAY AND THE MANUFACTURING METHOD THEREOF

(75) Inventor: Jiahn-Lin Lee, Taipei Hsien (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 51 days.

(21) Appl. No.: 10/605,325

(22) Filed: Sep. 23, 2003

(65) Prior Publication Data

US 2004/0252270 A1   Dec. 16, 2004

(30) Foreign Application Priority Data

Jun. 13, 2003   (TW) .............................. 92116075 A

(51) Int. Cl.
*G02F 1/1339*   (2006.01)
*G02F 1/1345*   (2006.01)

(52) U.S. Cl. ....................... 349/139; 349/153; 349/190

(58) Field of Classification Search ................ 349/139, 349/149, 151, 152, 153, 154, 156, 160, 190, 349/155

See application file for complete search history.

(56) References Cited

U.S. PATENT DOCUMENTS 6,151,092 A * 11/2000 Fujimura et al. ............ 349/156
6,219,126 B1   4/2001 Von Gutfeld ................ 349/153
6,222,603 B1 * 4/2001 Sakai et al. .................. 349/153

* cited by examiner

*Primary Examiner*—Dung T. Nguyen
*Assistant Examiner*—Tai Duong
(74) *Attorney, Agent, or Firm*—Jianq Chyun IP Office

(57) ABSTRACT

A liquid crystal display device includes two parallel substrates spaced apart, a sealant forming an enclosed space with the two substrates and a liquid crystal layer forming in the enclosed space. After at least a conducting layer and/or an insulating layer of the Thin Film Transistors and the pixel electrodes thereon is deposited on the one substrate, two masks serve to at least cover the conducting layer and/or the insulating layer. As deposition is continued, at least one conducting and/or insulating wall structure with specific pattern on the one substrate is formed. Thus, contamination and degradation of the liquid crystal can be avoided and further the two substrates can be conducted without using conductive material.

5 Claims, 22 Drawing Sheets

LIQUID CRYSTAL DISPLAY AND THE MANUFACTURING METHOD THEREOF

CROSS REFERENCE TO RELATED APPLICATIONS

This application claims the priority benefit of Taiwan application serial no. 92116075, filed on Jun. 13, 2003.

BACKGROUND OF INVENTION

1. Field of Invention

This invention relates to a liquid crystal device and the manufacturing method thereof. Moreover, this invention particularly relates to a liquid crystal device and manufacturing method for simultaneously forming conductive and/or insulating walls using Thin Film Transistor (TFT) Deposition as well as pixel electrode therein.

2. Description of Prior Art

The present liquid crystal device process comprises forming of Thin Film Transistor (TFT), Liquid Crystal Device (LCD) panel, and liquid crystal module. Common TFT structure includes gate metal layer, semiconductor layer (wherein semiconductor layer includes gate insulating layer, amorphous crystalline layer, and a n+ doping layer), source/drain metal layer, and passivation layer. The forming of TFT process includes repeated rinsing, deposition, yellow light exposure, developing, etching, and lift-off. Take gate metal layer for example, a substrate is rinsed firstly, followed by depositing a metal layer on substrate surface, coating photoresist on the metal layer, exposed under light, developing away the unwanted pattern, etching for desired pattern, and finally lift off the photoresist to form a gate metal layer. Continue on next mask accordingly.

The process of forming a LCD panel mainly comprises One Drop Fill process, i.e. ODF process, as shown in FIG. 1A. A sealant, an Ultraviolet sealant (UV sealant) for example, is applied to a substrate A1 in an enclosed form, and liquid crystal is dropped from a liquid crystal dispenser to the enclosed area as shown in FIG. 1B. After forming a uniform liquid crystal layer A4, take another substrate A2 to bond to substrate A1 that has the liquid crystal layer A4, and continue to irradiate (ultraviolet light, for example) the sealant A3 so as to adhere the two substrates A1 and A2 together (as shown in FIG. 1C). After an annealing process, the procedure is ultimately done.

However, the drawback to this technique is, some part of the liquid crystal layer A4 would be exposed to lighting when irradiating sealant A3 in order to adhere substrates A1 to A2, thus liquid crystal suffers from degradation.

Moreover, the liquid crystal layer A4 that contacts with the sealant A3 is possibly contaminated, which also downgrades display quality.

In order to avoid contact contamination between the liquid crystal A4 and the sealant A3, the US patent U.S. Pat. No. 6,219,126 discloses a method using coating or lithography techniques for building an enclosed liquid crystal wall structure that is made of acrylic resin or silicone. Nevertheless, the structure requires excess materials and steps that complicate the process.

JP patent JP2001-222017 as well discloses that in order to implement liquid crystal wall equivalency, a pigment-layer of deposited CF (color filter) substrate is used (as shown in FIG. 3). Yet in order to avoid liquid crystal degradation caused by ultraviolet lighting, masking effect has to be tied with pigment color as well as concentration control thereof.

Another prior art as shown in FIG. 4, a liquid crystal device comprises a TFT substrate B1 and a Color Filter (CF) substrate B2 in parallel with a liquid crystal layer B3 therebetween. When TFT substrate B1 that is voltage driven has a potential difference from CF substrate B2, the transmittance of the liquid crystal molecules is manipulated by voltage difference thereof. Generally, the voltage applied to CF substrate B2 is fixed as a common voltage Vcom so as to vary voltage V applying to pixel electrode B11 on TFT (not shown) to generate a potential difference $\Delta V=V-Vcom$. However, there is no terminal to CF substrate B2, Vcom voltage has to be provided by TFT.

For instance, usually Vcom voltage on TFT substrate B1 is transmitted to CF substrate B2 through conductive adhesive B4, however, it has to be done outside of sealant B5 by applying excess conductive adhesive B4 with an excess device. Obviously there is excess material cost and as well as the process has to be done after sealant is hardened.

In addition, as disclosed in US patent U.S. Pat. No. 6,404,480, a conductive spacer B6 is used to support and conduct TFT substrate B1 and CF substrate B2 as well as to be mixed with sealant B5 (as shown in FIG. 5), so as to perform conducting Vcom voltage. Yet conductive material is required and the process difficulty is raised and all sealant B5 is possibly not hardened.

SUMMARY OF INVENTION

In order to eliminate those drawbacks of prior art technologies, continuous efforts of researches and experiments were made so as to disclose this present invention.

Accordingly, one object of this present invention is to provide a liquid crystal device and its manufacturing method so as to simultaneous forming liquid crystal walls using deposit TFT process.

As embodied and broadly described herein, the invention provides a liquid crystal device (LCD), wherein the LCD includes a top and a bottom substrate in parallel, a sealant with which substrates thereof forming an enclosed space, and a liquid crystal layer forming within the enclosed space. When forming TFT and pixel electrode on inner surface of one of the substrates, a mask at least covers the deposited insulating layer and/or conductive layer in either step that forms the deposited insulating layer and/or conductive layer. Take another larger frame mask to simultaneously superimpose on one of the substrates to form a framing space in between the two masks, whereas the mask material is chosen depending on the insulating layer and the conductive layer, that is, a conductive material and insulating material respectively. Continue deposition in between the frame shape space so that deposition layer is formed. Remove the two masks after a predetermined period of time for deposition to form an enclosed liquid crystal wall so as to avoid contamination and/or degradation of liquid crystal.

Another object of this present invention is to provide liquid crystal device and manufacturing method exempted from conductive adhesive or conductive spacer.

To achieve the forgoing object, this present invention is implemented as follows.

A Liquid Crystal Device (LCD) is provided, wherein the LCD includes a top and a bottom substrate configured in parallel, a sealant that forms an enclosed space with the two substrates, and a liquid crystal layer formed within the enclosed space. In either step of forming the conductive layer of TFT and pixel electrode on the inner surface of one of the substrates. With a certain pattern on an insulating mask according to the circuit design, the mask is removed after deposition is continued in a predetermined period of time. A conductive wall pattern is formed on inner surface of one of the substrates in order to conduct to the other substrate; or.

A liquid crystal device is provided, wherein the LCD having a top and a bottom substrate in parallel, a sealant that forms an enclosed space with the two substrates, and a liquid crystal layer forming within the enclosed space. In either step of forming the conductive layer of TFT and pixel electrode on the inner surface of one of the substrates, to cover at least the deposited conductive layer with a mask, and apply another larger frame mask on the substrate simultaneously, so that frame shape spacing is formed in between the two masks. Notice that the material of the masks is insulating. Continue the deposition process in between the frame spacing, an enclosed conductive wall is formed after removal of the two masks in a predetermined period of time; or.

A liquid crystal device is provided, wherein the LCD comprises a top and a bottom substrates in parallel, a sealant forming an enclosed space with the two substrates, and a liquid crystal layer formed within the enclosed space. In either step of forming the insulating layer of TFT and pixel electrode on inner surface of one of the substrates to apply one mask to at least cover the deposited insulating layer, and apply another larger frame mask to the substrate simultaneously so as to form a frame shape mask in between the two masks. Continue the deposition; an enclosed insulating wall is formed in between the two masks after removal of the two masks in a predetermined period of time to apply a mask having certain circuit pattern that is insulating to go on deposition, a conductive wall is built on the inner surface of one of the substrates after removal of the mask in a predetermined period of time, so as to conduct to another substrate; or.

A liquid crystal device is provided, wherein the LCD comprises a top and a bottom substrate in parallel, a sealant that forms an enclosed space with the two substrates, and liquid crystal layer within the enclosed space. In either step of forming the conductive layer of TFT and pixel electrode on inner surface of one of the substrates, A mask is applied to at least cover the deposited layer while another larger frame mask is superimposed simultaneously on the substrate to form frame spacing in between the two masks. Notice that the materials of the masks are insulating. Continue the deposition; an enclosed conductive wall is deposited in between the frame spacing after removal of the two masks in a predetermined period of time. Another deposition is applied to form a conductive layer on the insulating layer. A certain circuit patterned on an insulating mask with is applied to continue deposition, so as to obtain a conductive wall pattern on inner surface of the substrate for conducting to the other substrate after removal of the mask after a predetermined period of time.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 6A:
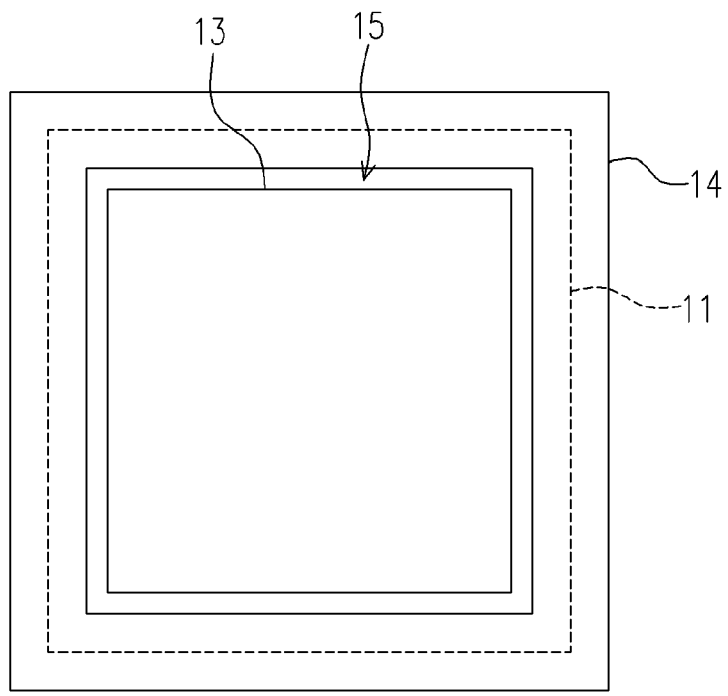
FIGS. 6A to 6F illustrate a first set of diagrams of formation of LCD panel according to first preferred embodiment of the present invention.

First Embodiment of the Present Invention: As shown in the FIGs. from 6A to 6F, a TFT formation process is performed on a substrate 11. To be simplified, only single TFT is illustrated in this and the other preferred embodiments in this invention. After depositing the gate metal layer 17, manipulate the mask 13 to at least cover the gate metal layer 17, and as well superimpose another larger frame mask 14 on the substrate 11 simultaneously. A frame spacing 15 (as shown in top view diagram in FIG. 6A) is formed in between the two masks, 13 and 14. The materials of masks 13 and 14 are those not prone to bond to metal, such as insulator, or processed material so that it does not prone to bond to metal. Notice that manipulation of masks 13 and 14 is automated.

Figure 6B:
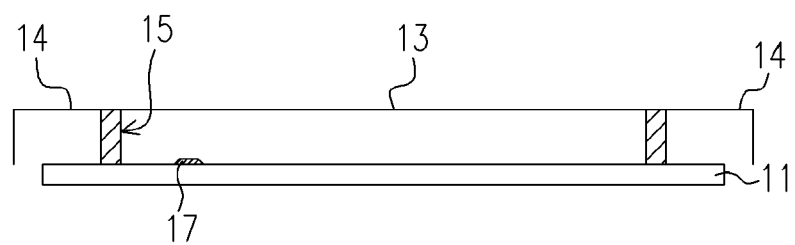
Figure 6C:
Figure 6D:
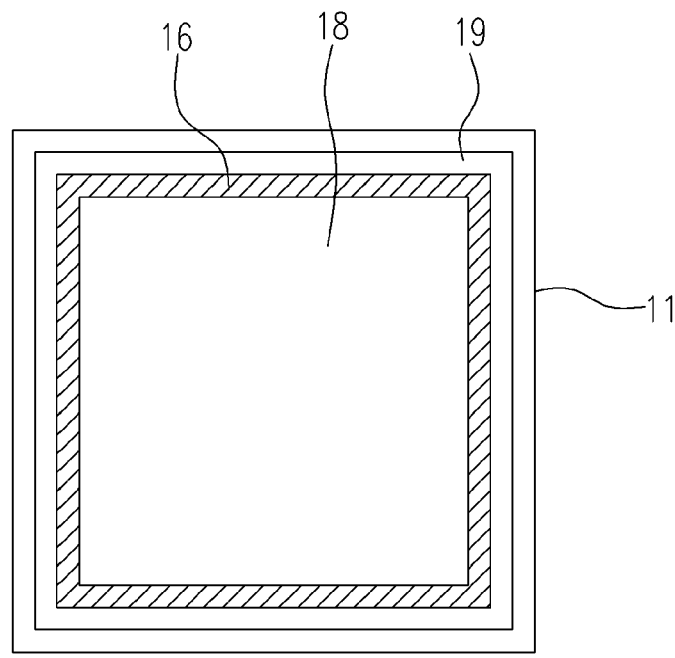
Figure 6E:
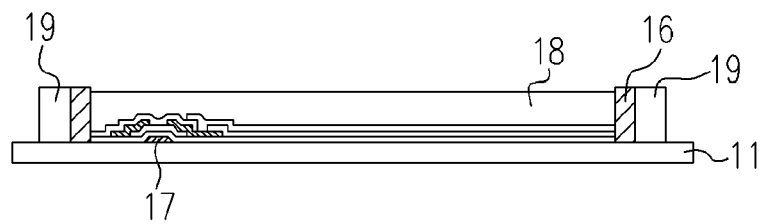
Figure 6F:
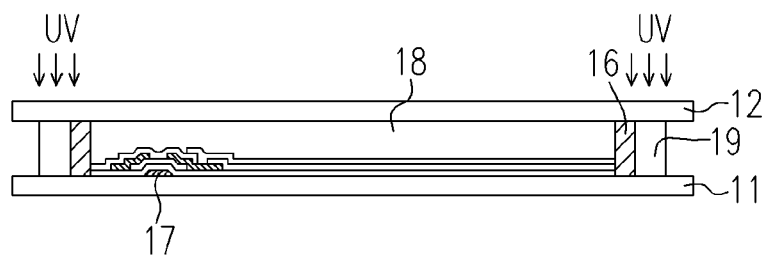

As deposition is continued within the frame spacing 15 (as shown in FIG. 6B), an enclosed metal wall 16 is built after removal of the two masks 13 and 14 in a predetermined period of time. To accomplish the forming of the TFT (as shown in FIG. 6C), liquid crystal is dropped to the metal wall 16, and to enable to form a uniform liquid crystal layer 18. An ultraviolet sealant 19 is coated on periphery of metal wall 16 (as shown in a top view in FIG. 6D and a cross-sectional view in FIG. 6E) in order to be pre-sealed to another substrate 12. Then use UV light hardens the UV sealant 19 so that substrates 11 and 12 are bonded. An annealing process is applied so as to accomplish a liquid crystal display panel (as illustrated in FIG. 6F).

The metal wall 16 is bonded to both the top and bottom substrates 11 and 12, thus the liquid crystal layer 18 has no contact to UV sealant 19 so as to avoid contamination of liquid crystal that causes degradation of display quality.

Moreover, when UV light irradiates the UV sealant 19 to bond substrates 11 and 12 together, the formation of enclosed metal wall 16 entirely blocks UV light transmitting from either side of the two bonded substrates 11 and 12, thus degradation of liquid crystal is avoided.

Furthermore, the metal wall 16 formed on the substrate 11 contacts another substrate 12 so as to conduct substrate 11 (i.e. TFT substrate) to substrate 12 (i.e. Color Filter, CF substrate), as well as supports the structure, where conductive material, e.g. conducting adhesive or conductive spacer, is not necessary.

Second Preferred Embodiment: FIGS. 7A to 7F illustrate the formation of TFT on the surface of a substrate 21. A source/drain metal layer 27 is deposited following by manipulating a mask 23 to at least cover the source/drain metal layer 27. Another larger frame mask 24 simultaneously superimposes on substrate 21 to form a frame spacing 25 in between the two masks 23 and 24 (as illustrated in a top view in FIG. 7A). Notice that the masks 23 and 24 are made of materials that do not prone to bond to metal, insulator for example, or made of processed material that does not prone to bond to metal. Furthermore, the manipulation of masks 23 and 24 is automated.

Figure 7A:
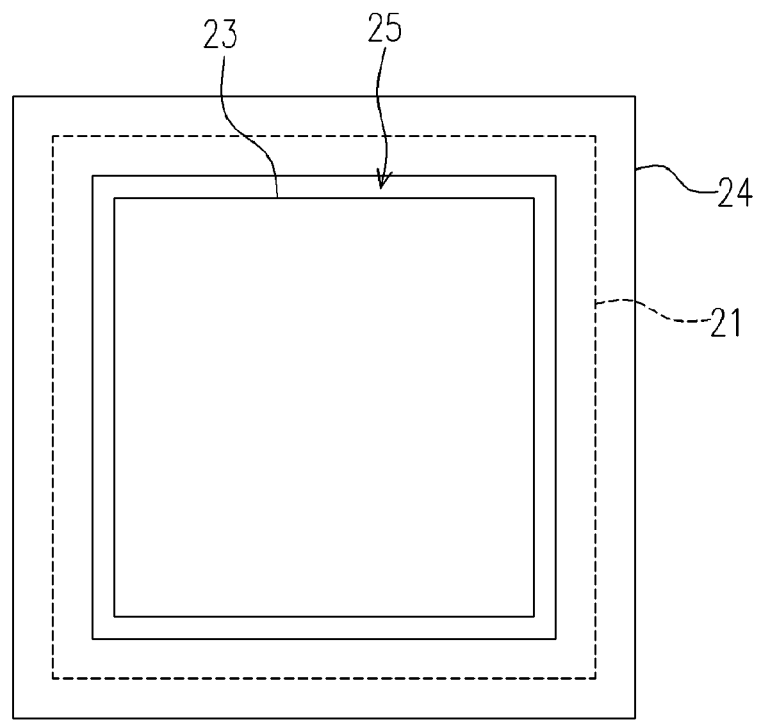
FIGS. 7A to 7F illustrate a second set of diagrams of formation of LCD panel according to second preferred embodiment of the present invention.
Figure 7B:
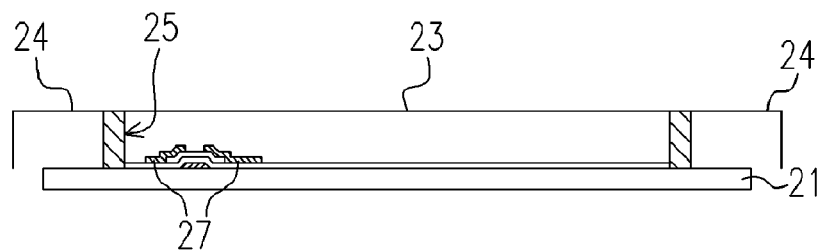
Figure 7C:
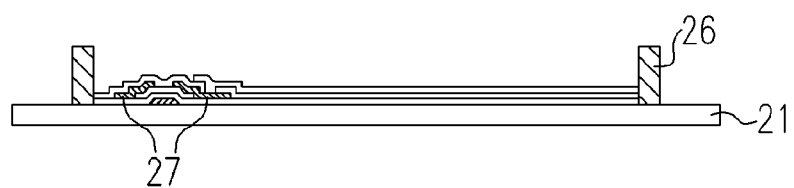
Figure 7D:
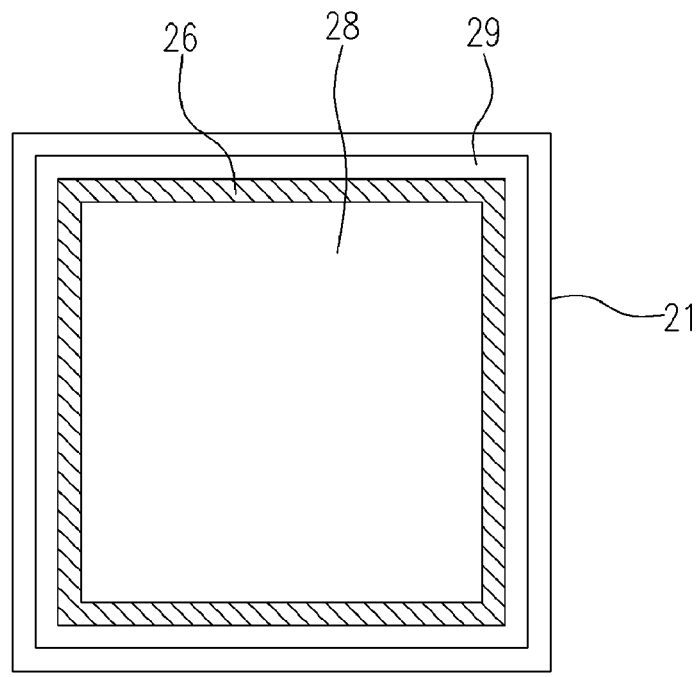
Figure 7E:
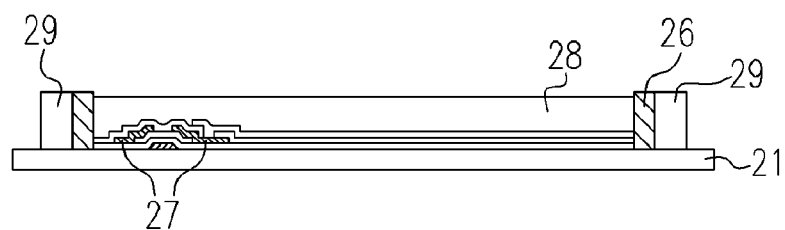
Figure 7F:
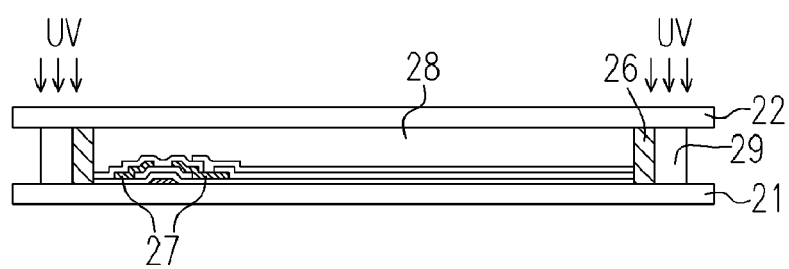

Deposition is continued in the frame spacing 25 (as illustrated in FIG. 7B) and an enclosed metal wall 26 is formed after removal of the two masks 23 and 24 so as to complete the TFT formation process (as illustrated in FIG. 7C). Dropping liquid crystal to the metal wall 26 and to enable to form a uniform liquid crystal layer 28 is followed by coating UV sealant 29 along periphery of the metal wall 26. (as illustrated in a top view diagram of FIG. 7D and a cross-sectional view diagram of FIG. 7E) Another substrate 22 is then adhered and processed the UV light exposure so as to take UV sealant 29 into effect, i.e. bonding substrates 21 and 22 together. The last process step is annealing, thereof a liquid crystal display panel is completed (as illustrated in FIG. 7F).

For the metal wall 26 is bonded to the top and the bottom substrates 21 and 22, liquid crystal layer 28 has no contact with UV sealant 29 so that contamination of liquid crystal and degradation of display quality are avoided.

In addition, while irradiating UV light to harden UV sealant 29 in order to bond substrates 21 and 22, UV light is completely blocked by the bonded substrates 21 and 22 from any side, thus degradation of liquid crystal is avoided.

Moreover, the metal wall 26 formed on substrate 21 contacts another substrate 21 so as to simultaneously conduct substrate (TFT substrate) to substrate 22 (CF substrate) as well as supports the structure, where conducting adhesive or conducting spacer are not necessary.

Third Preferred Embodiment: Referring to FIGS. 8A to 8F, a TFT forming process is performed on a substrate 31. After depositing pixel electrode layer (Indium-Tin Oxide, ITO, for example), manipulate a mask 33 to at least cover pixel electrode layer 37. Manipulating a larger frame mask 34 to simultaneously superimpose on substrate 31, so as to form a frame spacing 35 between the two masks 33 and 34 (as illustrated in top view diagram in FIG. 8A). Notice that materials constituting masks 33 and 34 are those not prone to bond to metal, such as insulator, or processed material that does not prone to bond to metal. Also notice that manipulation of masks 33 and 34 is automated.

Figure 8A:
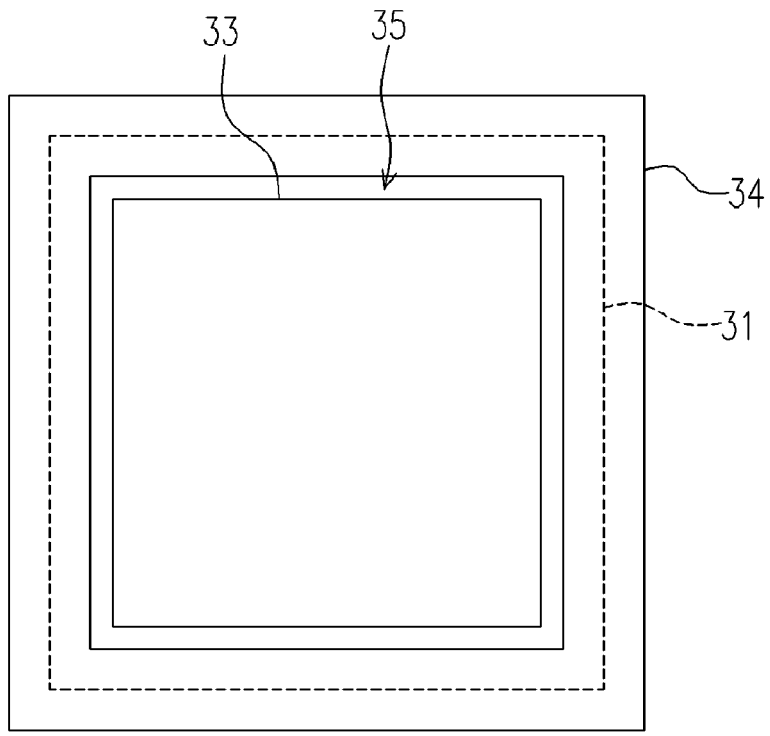
FIGS. 8A to 8F illustrate a third set of diagrams of formation of LCD panel according to third preferred embodiment of the present invention.
Figure 8B:
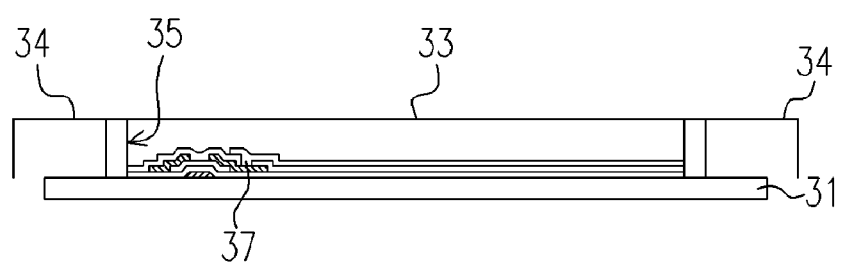
Figure 8C:
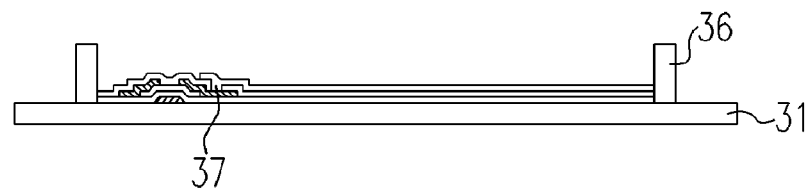
Figure 8D:
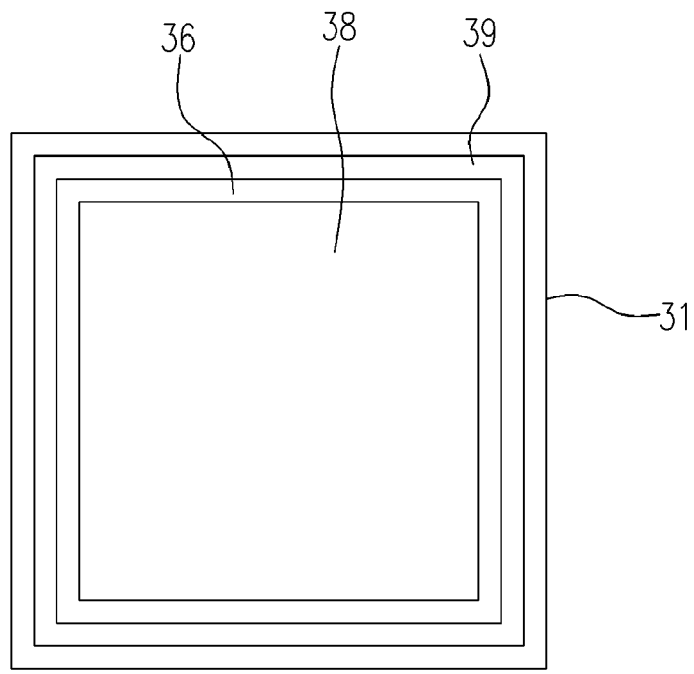
Figure 8E:
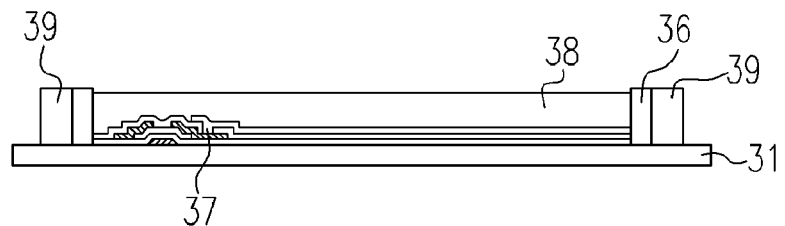
Figure 8F:
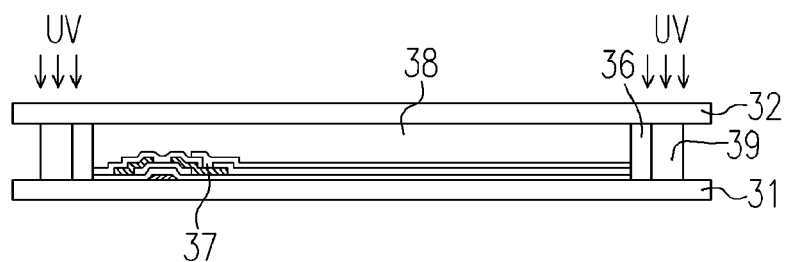

As deposition is continued, it is performed within the frame spacing 35. As the two masks 33 and 34 is removed in a predetermined period of time, an enclosed metal wall 36 is formed and to continue TFT formation process thereof (as illustrated in FIG. 8C). Liquid crystal is dropped in metal wall 36 and to enable to form an uniform liquid crystal layer 38, UV sealant 39 is further coated along metal wall 36 (as illustrated in top view diagram in FIG. 8D and cross-sectional diagram in FIG. 8E). To pre-seal with another substrate 32, and UV sealant 39 is hardened by UV irradiation in order to bond substrates 31 and 32 together, and an annealing step is performed therein to complete a liquid crystal display panel (as illustrated in FIG. 8F).

Since metal wall 36 is bonded to substrates 31 and 32, liquid crystal layer 38 is blocked by UV sealant so as to avoid contamination of liquid crystal that causes degradation of display quality.

Furthermore, the formation of the metal wall 36 on the substrate 31 is to contact another substrate 32 so as to simultaneously conduct the substrate 31 (i.e. TFT substrate) to the substrate 32 (i.e. CF substrate) as well as to support the structure without conductive adhesive or conductive spacer.

Figure 9A:
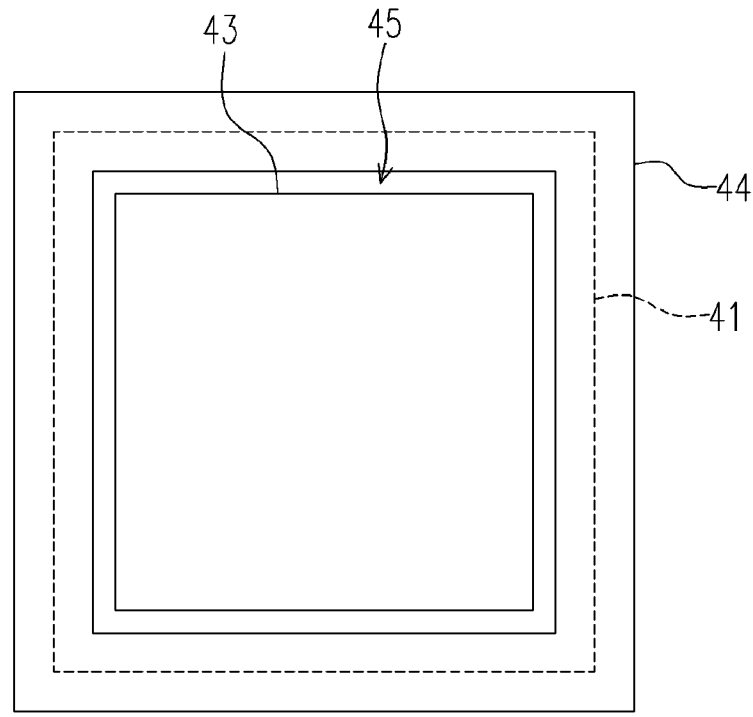
FIGS. 9A to 9F illustrate a fourth set of diagrams of formation of LCD panel according to fourth preferred embodiment of the present invention.

The Fourth Preferred Embodiment: Referring to the FIGS. 9A to 9F, TFT formation process is implemented on substrate 41 therein. As semiconductor layer 47 is deposited, manipulate a mask 43 in order to at least cover the semiconductor layer 47. Also manipulate another larger frame mask 44 to simultaneously superimpose on the substrate 41. A frame spacing 45 is thus formed between the two masks 43 and 44 (as illustrated in the top view diagram in FIG. 9A). Notice that the material to the masks 43 and 44 does not prone to bond to insulator, such as conductive material, or processed material that does not prone to bond to insulator. Also notice that manipulation of masks 43 and 44 is automated.

Figure 9B:
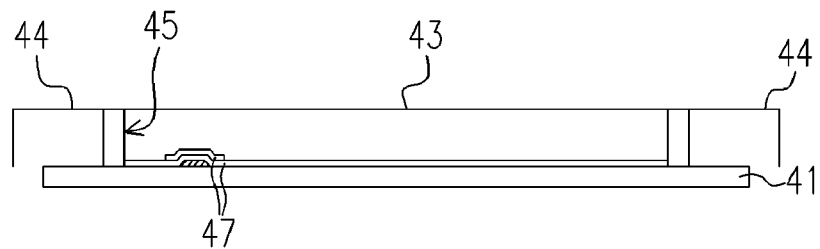
Figure 9C:
Figure 9D:
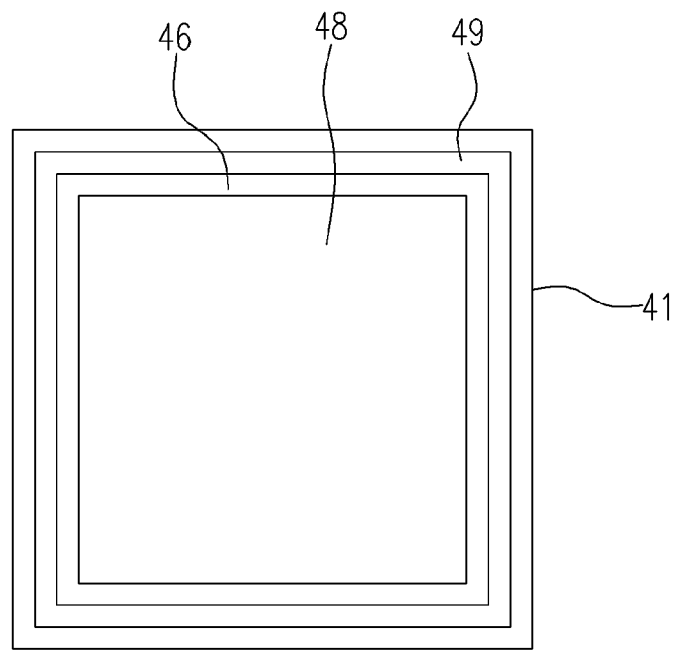
Figure 9E:
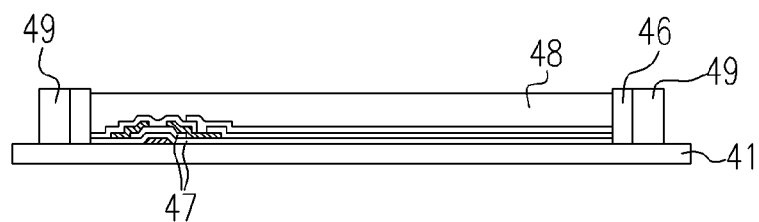
Figure 9F:
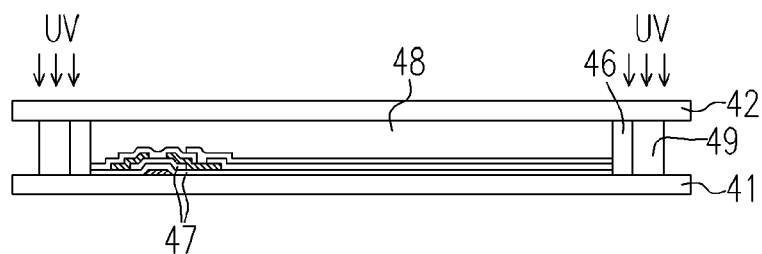

As deposition is continued, deposition is performed within the frame spacing 45 (as illustrated in FIG. 9B). An enclosed insulating wall 46 is built after removal of the two masks 43 and 44 in a predetermined period of time. To complete TFT formation process (as illustrated in FIG. 9C), liquid crystal is dropped to the insulating wall 46, and to enable to form a uniform liquid crystal layer 48. UV sealant 49 is coated along the periphery of the insulating wall 46 (as shown in a top view diagram of FIG. 9D and a cross-sectional view diagram of FIG. 9E) so as to pre-seal to another substrate 42. Then UV type sealant is hardened by UV irradiation so as to bond substrates 41 and 42 together. An annealing process is exerted ultimately and thus a liquid crystal display panel is formed thereof (as illustrated in FIG. 9F).

Since insulating wall 46 is bonded to the substrates 41 and 42, the liquid crystal layer 48 has no contact to the UV sealant 49, liquid crystal is free from contamination that degrades the display quality.

Furthermore, the insulating layer 46 formed on the substrate 41 manages to support the structure similar to conventional spacer therein.

The Fifth Preferred Embodiment: Referring to FIGS. 10A to 10F, TFT formation process is performing on substrate 51 therein. After a passivation layer 57 is deposited, to manipulate a mask 53 in order to at least cover the passivation layer 57, and also manipulate another lager frame mask 54 to simultaneously superimpose on the substrate 51. A frame spacing 55 is thus formed between the two masks 53 and 54 (as illustrated in top view diagram FIG. 10A). Notice that material of masks 53 and 54 does not prone to bond to insulator, such as conductive material, or processed material so as to not prone to bond to insulator. Also notice that manipulation of masks 53 and 54 is automated.

Figure 10A:
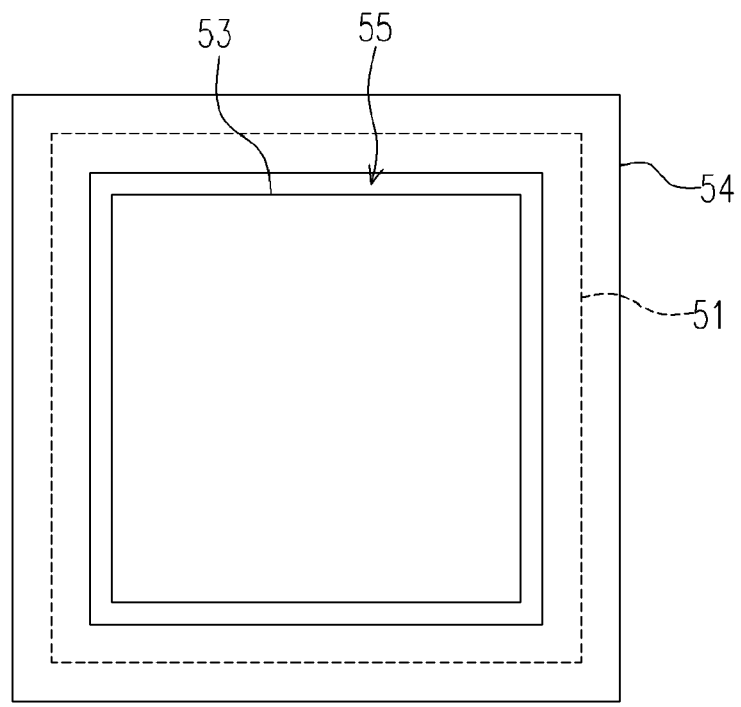
FIGS. 10A to 10F illustrate a fifth set of diagrams of formation of LCD panel according to fifth preferred embodiment of the present invention.
Figure 10B:
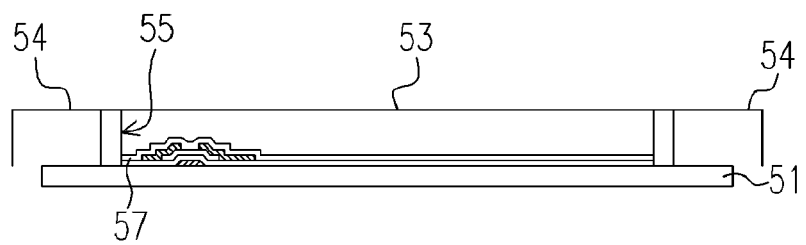
Figure 10C:
Figure 10D:
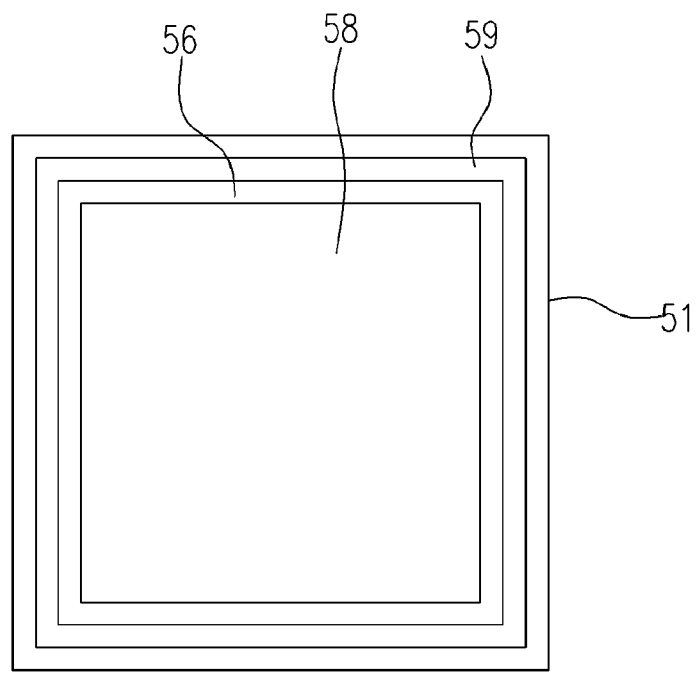
Figure 10E:
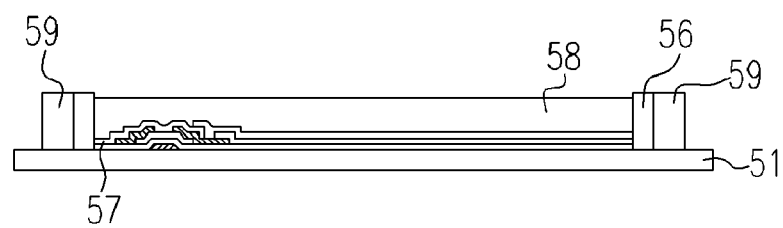
Figure 10F:
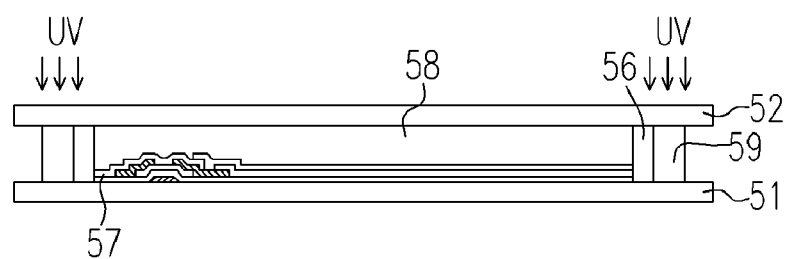

As deposition is continued, deposition is performed in the frame spacing 55 (as illustrated in FIG. 10B). After removal of the two masks 53 and 54 in a predetermined period of time, an enclosed insulating wall 56 is built therein. In order to complete TFT formation process (as illustrated in FIG. 10C), liquid crystal is dropped to the insulating wall 56 and to enable to form a uniform liquid crystal layer 58. UV sealant 59 is coated along periphery of the insulating wall 56 (as illustrated in the top view diagram of FIG. 10D and cross-sectional diagram of FIG. 10E) so as to pre-seal to another substrate 52. Then UV sealant is irradiated by UV light so that substrates 51 and 52 are bonded together. An annealing step is ultimately implemented so as to complete a liquid crystal display panel (as illustrated in FIG. 10F).

Since the insulating wall 56 is bonded to the substrates 51 and 52, the liquid crystal layer 58 has no contact to the UV sealant 59 so as to avoid contamination that degrades display quality.

Furthermore, the insulating wall 56 formed on the substrate 51 manages to support the structure similar to a conventional spacer.

Figure 11A:
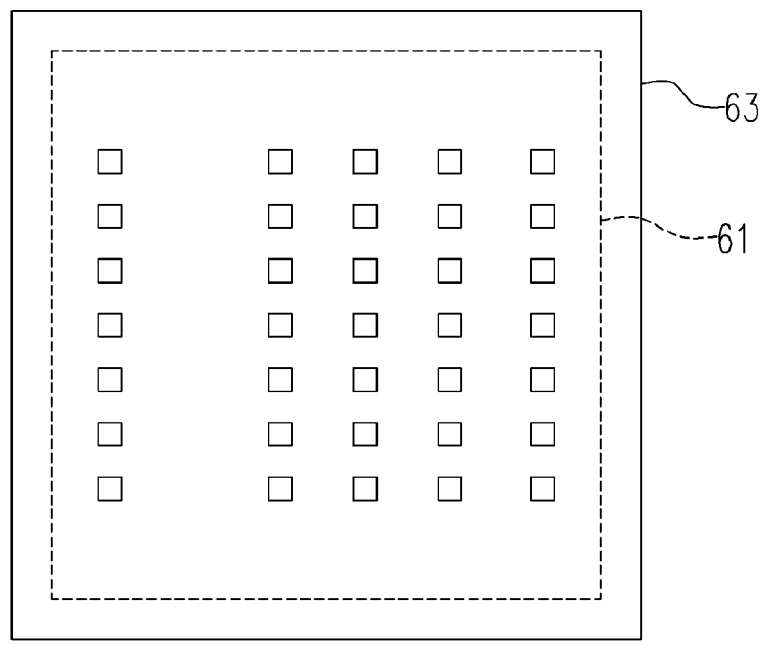
FIGS. 11A to 11F illustrate a sixth set of diagrams of formation of LCD panel according to sixth preferred embodiment of the present invention.
Figure 11B:
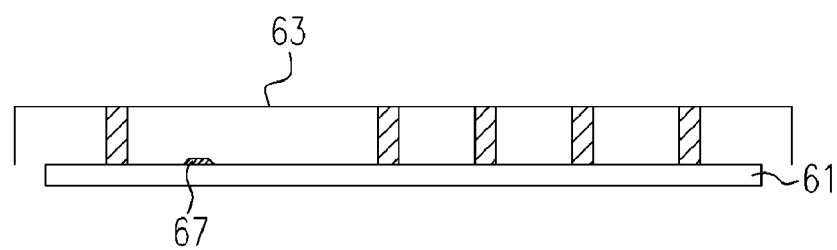
Figure 11C:
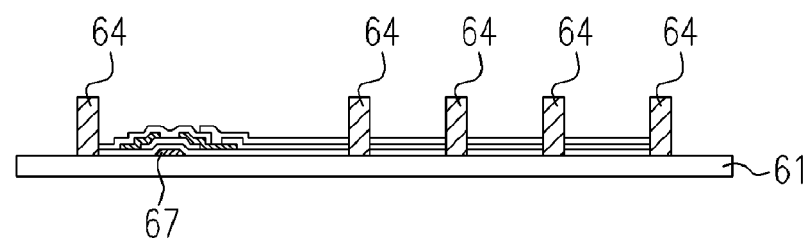
Figure 11D:
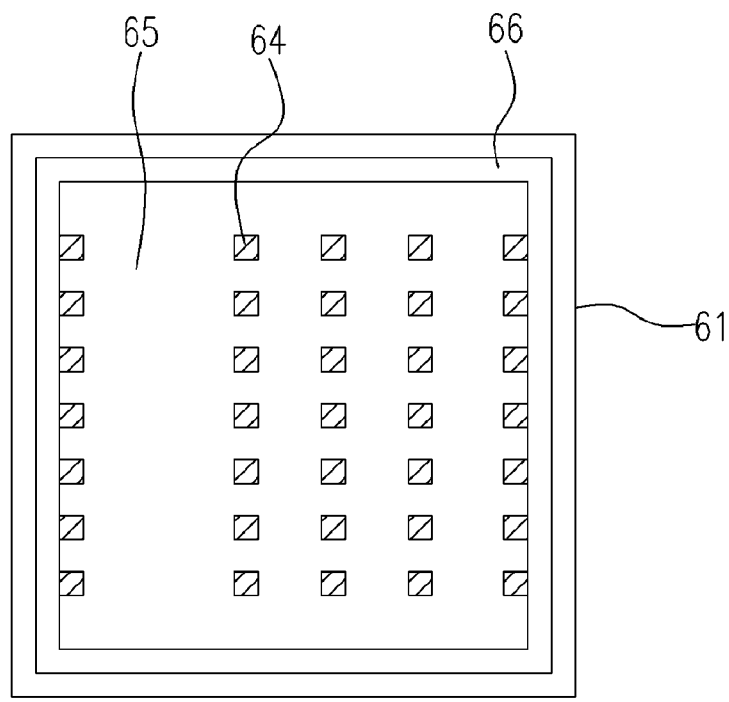
Figure 11E:
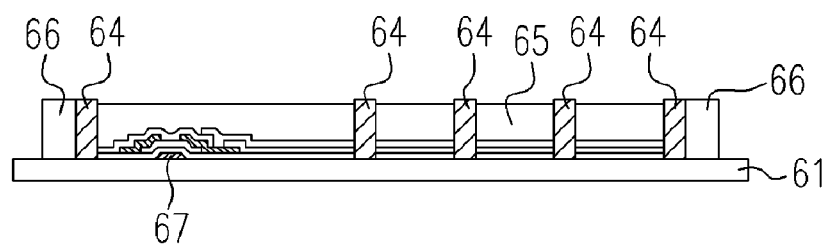

The Sixth Preferred Embodiment: Referring to the FIGS. 11A to 11F, TFT formation process is performed on a substrate 61. After a conductive layer 67 (gate metal layer, drain/source metal layer or pixel electrode layer, wherein gate metal layer is introduced as an example) is deposited, manipulate a mask 63 that patterned with a specific circuit design is superimposed on the substrate 51. Notice that material of mask 63 does not prone to bond to metal, such as insulator, or processed material that does not prone to bond to metal. Also notice that manipulation of the mask 63 is automated (as illustrated in FIG. 11B).

Figure 1A:
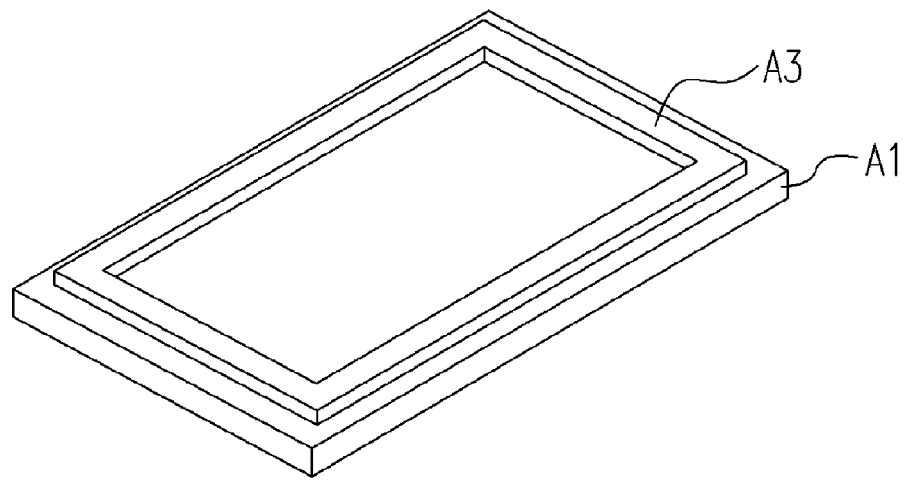
FIGS. 1A to 1C illustrate a first set of diagrams of conventional liquid crystal dropping process.
Figure 1B:
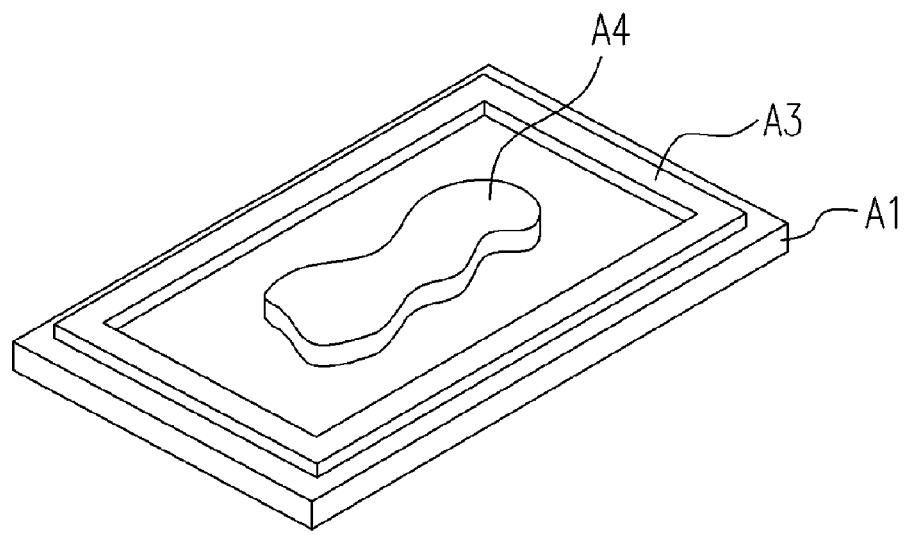
Figure 1C:
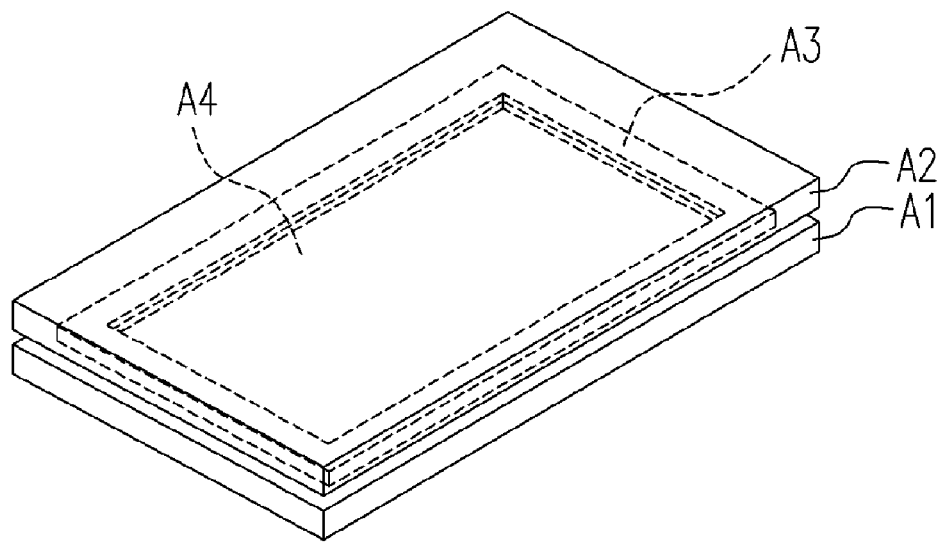
Figure 2:
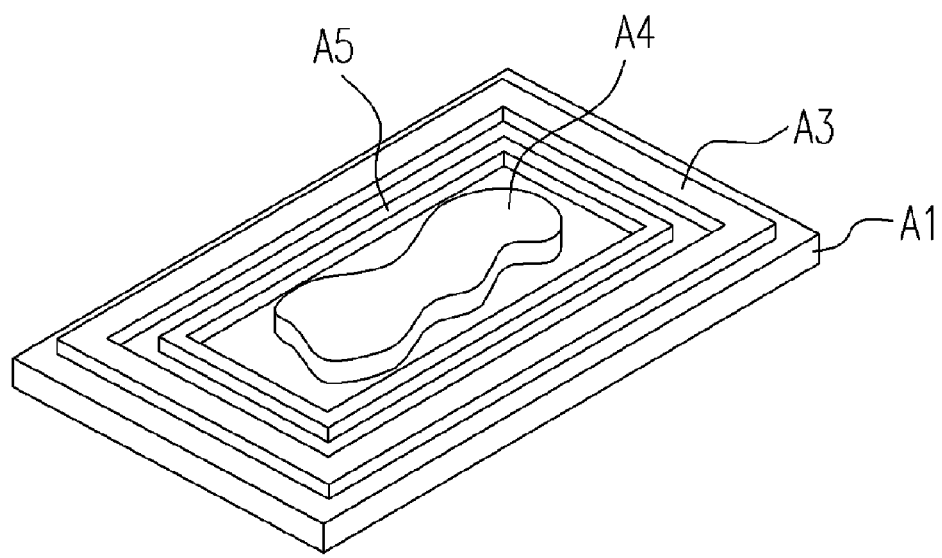
FIG. 2 illustrates a second set of diagrams of conventional liquid crystal dropping process.
Figure 3:
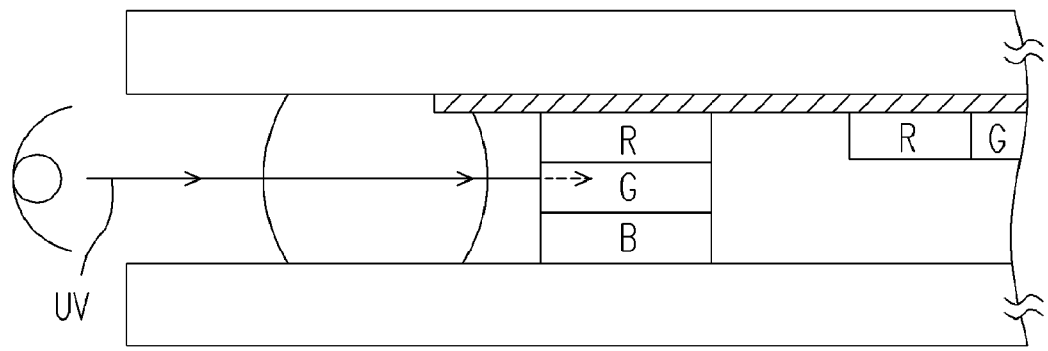
FIG. 3 illustrates a first cross-sectional diagram of a conventional Liquid Crystal Display (LCD) panel.
Figure 4:
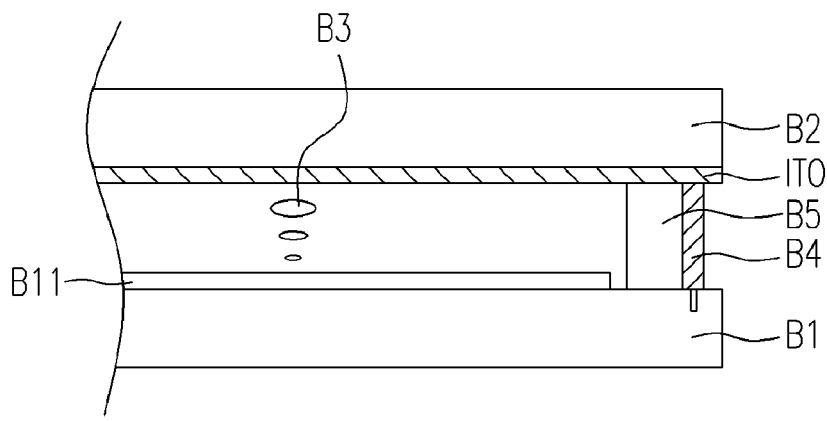
FIG. 4 illustrates a second cross-sectional diagram of a conventional LCD panel.
Figure 5:
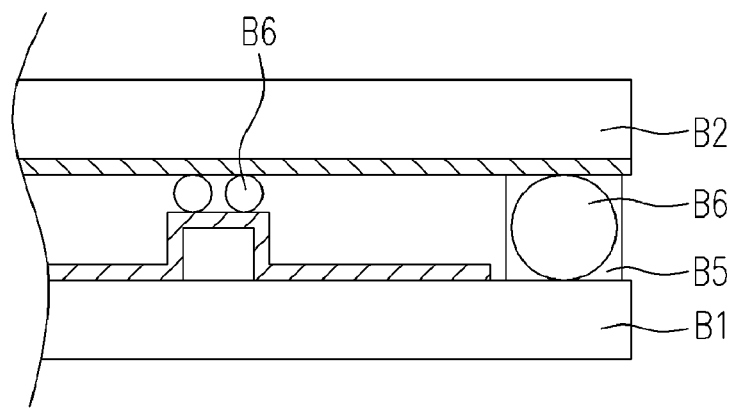
FIG. 5 illustrates a third cross-sectional diagram of a conventional LCD panel.
Figure 11F:
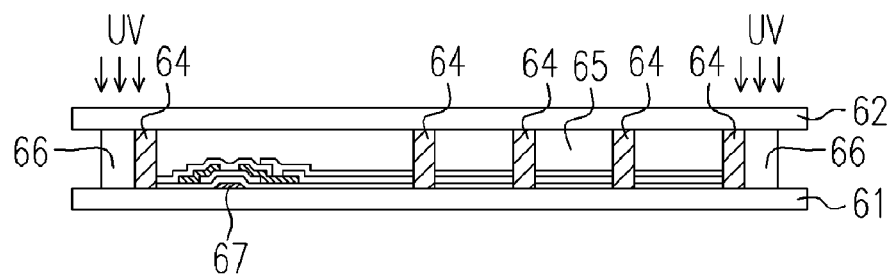

As deposition is continued, after removal of the mask 63 in a predetermined period of time, a pattern of conductive wall 64 is formed therein. In order to complete TFT formation process (as illustrated in FIG. 1C), UV sealant 66 is coated along periphery of substrate 61, and liquid crystal is dropped to the conductive wall 64 and to enable to form an uniform liquid crystal layer 65. (as illustrated in top view diagram of FIG. 11D and cross-sectional view diagram of FIG. 11E). To pre-seal another substrate 62, then UV sealant is exposed to UV light so as to be hardened as well as bonding substrates 61 and 62 together. Ultimately an annealing process is performed to complete a liquid crystal display panel (as illustrated in FIG. 11F).

Notice that conductive material (e.g. conductive adhesive or conductive spacer) is not required, for the conductive wall pattern 64 that is formed on substrate 61 manages to conduct from substrate 61 (i.e. TFT substrate) to another substrate 62 (i.e. CF substrate) as well as manages to support the structure.

The Seventh Preferred Embodiment: Referring to FIGS. 12A to 12H, process of TFT formation is performed on a substrate 71. After insulating layer 711 (semiconductor layer or passivation layer, semiconductor layer is exemplary herein) is deposited, manipulate a mask 73 so as to at least cover the insulating layer 711, as well as manipulate a larger frame mask 74 to simultaneously superimpose on the substrate 71. Thus a frame spacing 75 between the two masks 73 and 74 is implemented therein (as illustrated in top view diagram in FIG. 12A). The masks 73 and 74 are not prone to bond with insulating materials, for example, a conductive material, or a processed material that does not bond with insulating materials. Notice thattemptemp the manipulation of masks 73 and 74 is automated.

Figure 12A:
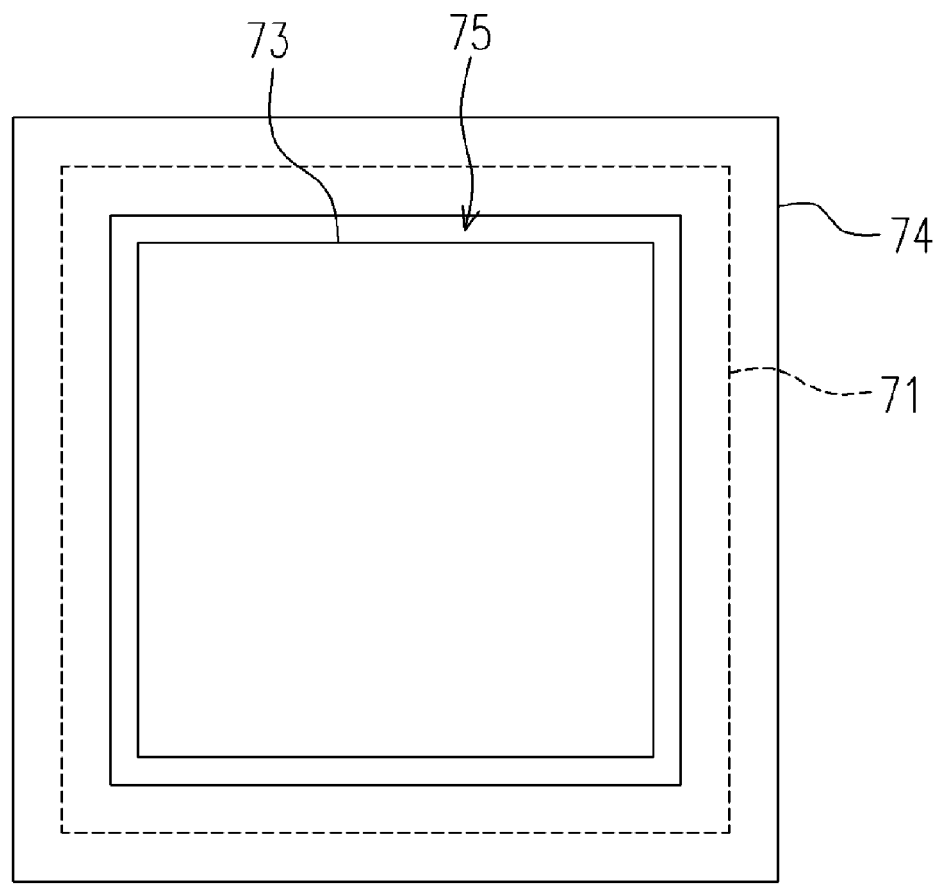
FIGS. 12A to 12H illustrate seventh set of diagrams of formation of LCD panel according to seventh preferred embodiment of the present invention.
Figure 12B:
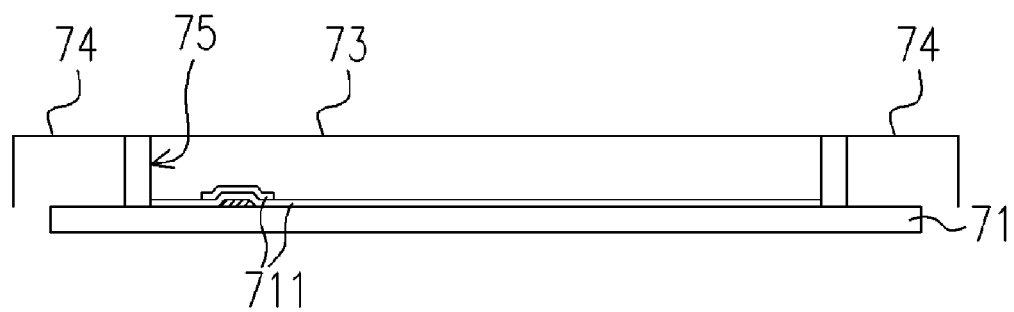
Figure 12C:
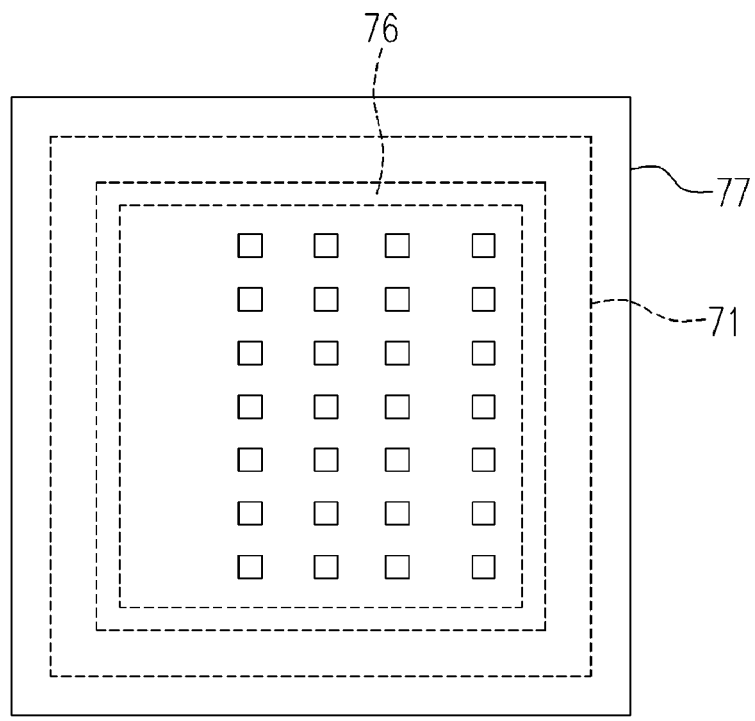
Figure 12D:
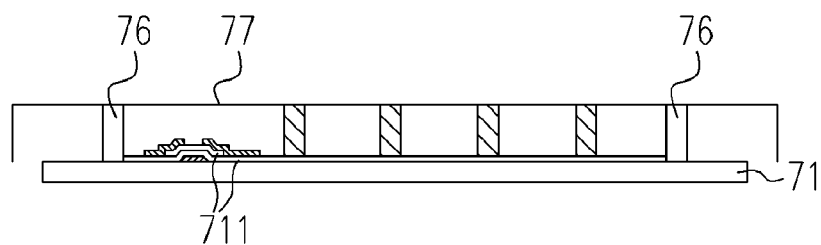
Figure 12E:
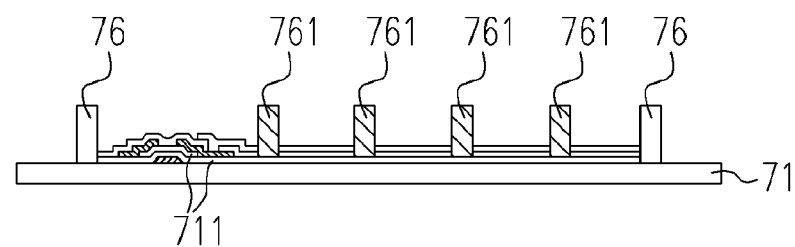
Figure 12F:
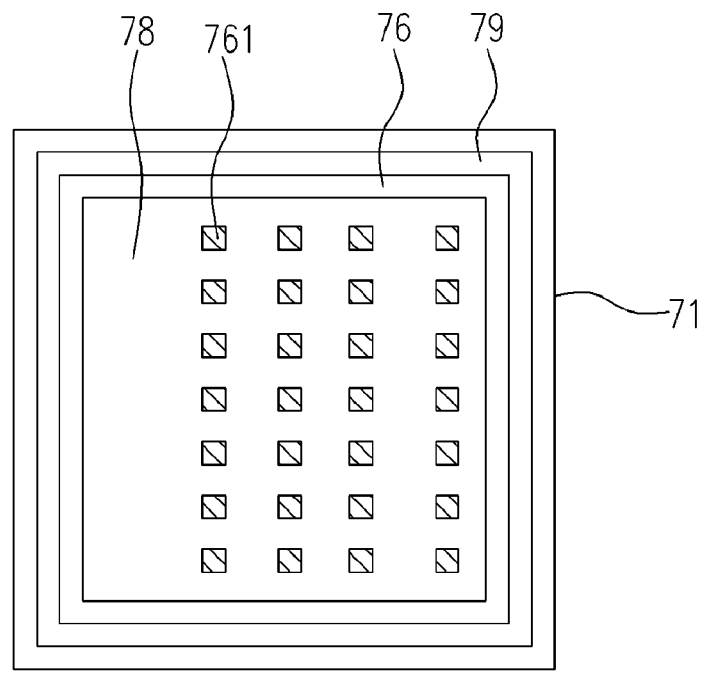
Figure 12G:
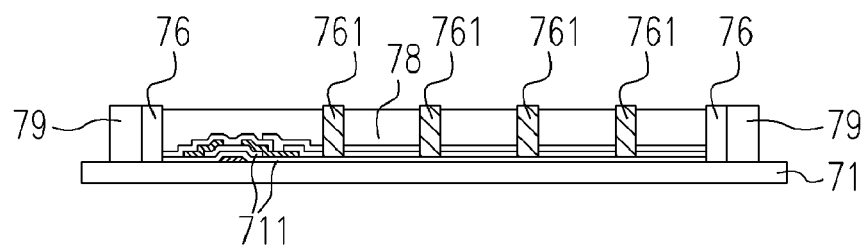
Figure 12H:
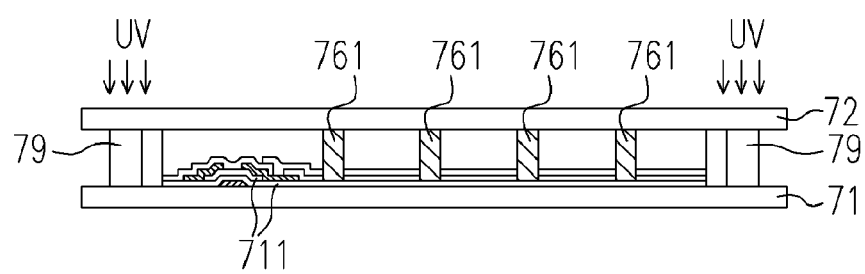

As deposition is continued, as well as depositing in the frame spacing 75 (as illustrated in FIG. 12B), an enclosed insulating wall 76 is formed after removal of the two masks 73 and 74 in a predetermined period of time. As a conductive layer (a source/drain metal layer or pixel electrode layer, for example) is deposited thereafter, manipulate a specific patterned mask 77 (as illustrated in top view diagram FIG. 12C) while deposition is proceeding (as illustrated in FIG. 12D), a specific conducting wall pattern 761 is formed on the substrate 71 after removal of the mask 77 in a predetermined of time. To complete process of TFT formation (as illustrated in FIG. 12E), liquid crystal is dropped to the insulating wall 76 and to enable to form a uniform liquid crystal layer 78. An UV sealant 79 is coated along periphery of the insulating wall 76 (as illustrated in top view diagram in FIG. 12F and cross-sectional view diagram in FIG. 12G). To pre-seal another substrate 72, then UV sealant 79 is exposed to UV light so as to be hardened as well as bonding substrate 71 and 72 together. Lastly an annealing process is performed to complete a liquid crystal display panel (as illustrated in FIG. 12H).

Since that the insulating wall 75 is bonded to the substrates 71 and 72, the liquid crystal layer 78 has no contact to UV sealant 79 so as to avoid contamination of liquid crystal and degradation of display quality.

Also that conductive material (e.g. conductive adhesive or conductive spacer) is not necessary, for the conductive wall pattern that is formed on substrate 71 manages to conduct from substrate 71 (i.e. TFT substrate) to another substrate 72 (i.e. CF substrate) as well as manages to support the structure.

The Eight Preferred Embodiment: Referring to FIGS. 13A to 13H, process of TFT formation process is performed on a substrate 81. After conductive layer 811 (gate metal layer or source/drain metal layer or pixel electrode layer, where gate metal layer is exemplary herein) is deposited, manipulate a mask 83 so as to at least cover the conductive layer 811. Also manipulate a larger frame mask 84 to simultaneously superimpose on the substrate 81, thus a frame spacing 85 between the two masks 83 and 84 is formed therein (as illustrated in top view diagram in FIG. 13A). The masks 83 and 84 are not prone to bond with conductive materials, for example, an insulating material, or a processed material that does not to bond with conductive materials. Notice that the manipulation of masks 83 and 84 is automated.

Figure 13A:
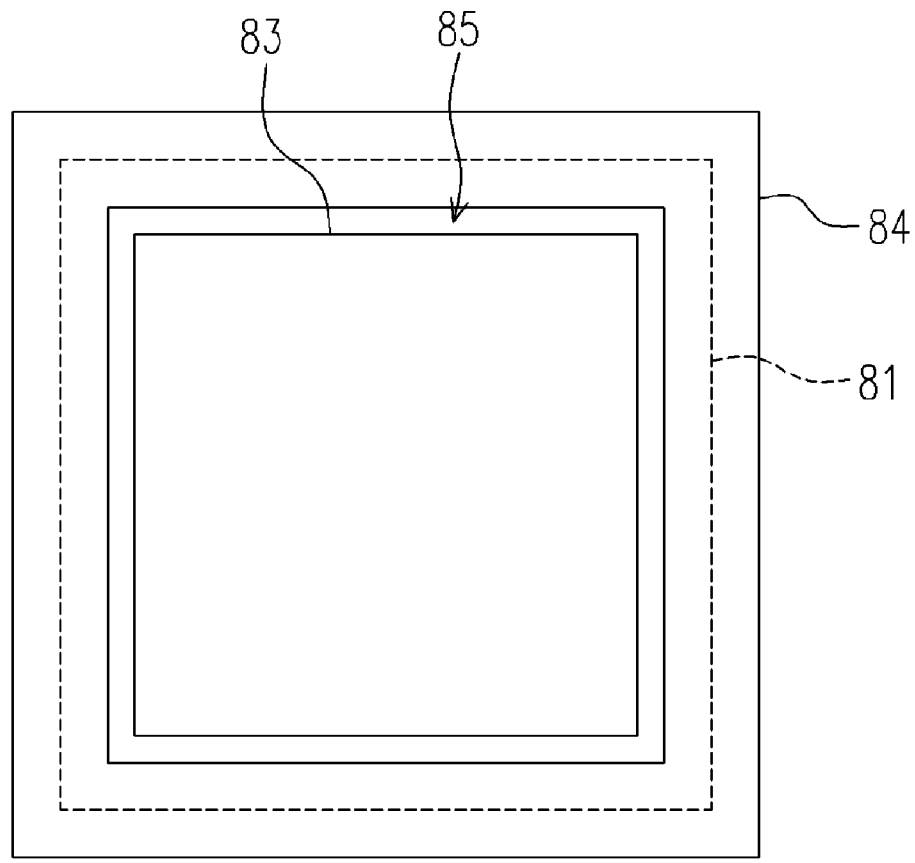
FIGS. 13A to 13H illustrate eighth set of diagrams of formation of LCD panel according to eight preferred embodiment of the present invention.
Figure 13B:
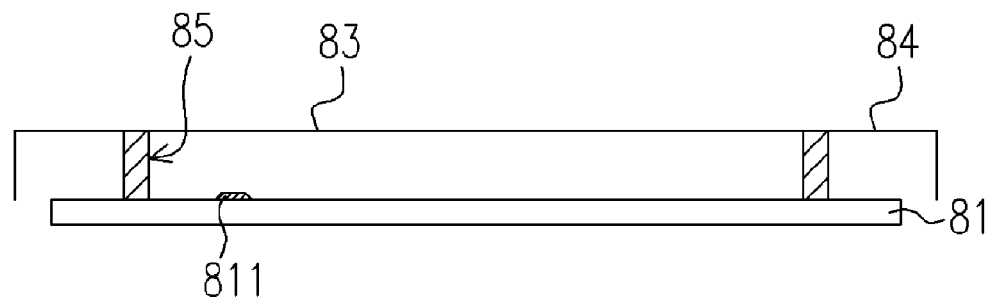
Figure 13C:
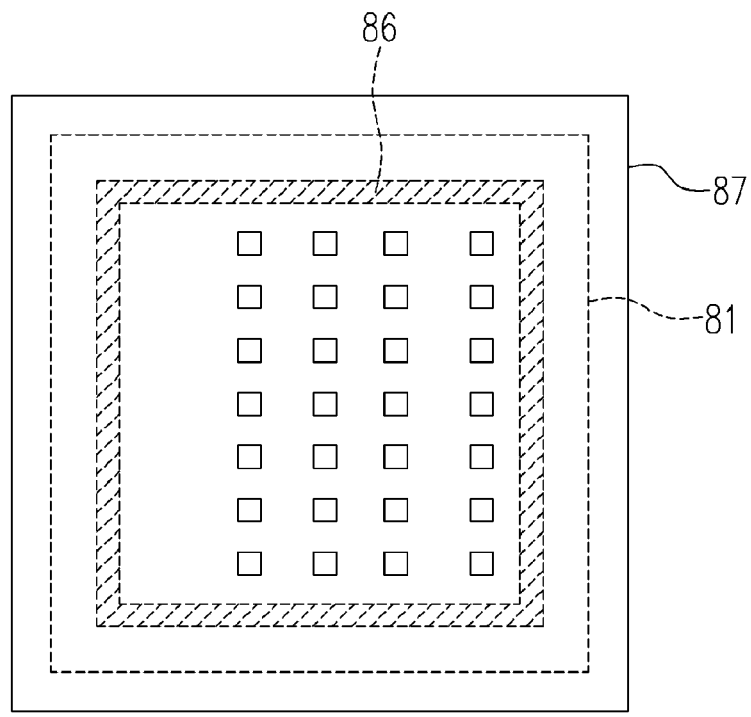
Figure 13D:
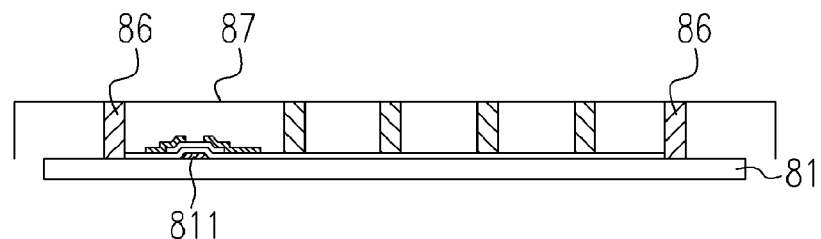
Figure 13E:
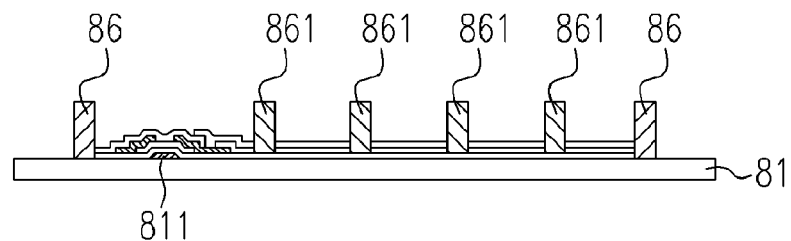
Figure 13F:
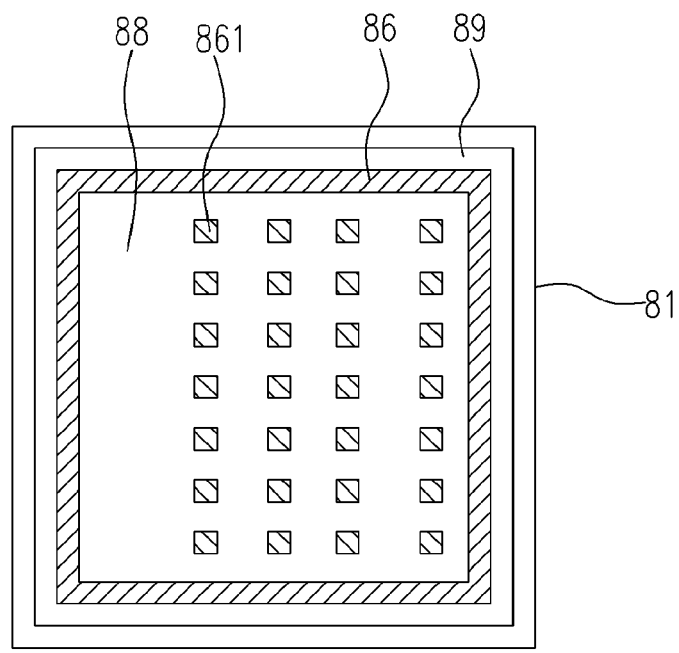
Figure 13G:
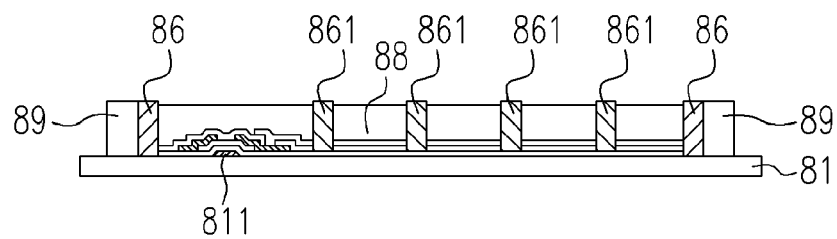
Figure 13H:
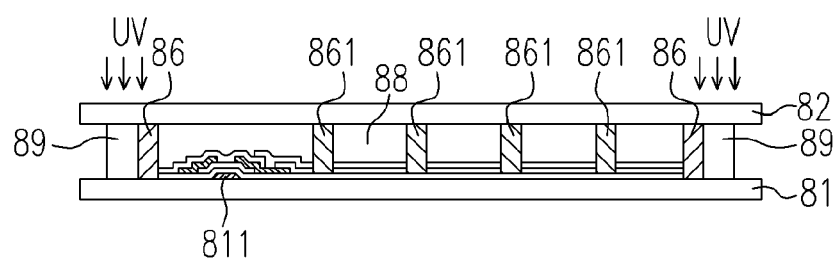

As deposition is continued, as well as depositing within the frame spacing 85 (as illustrated in FIG. 13B), an enclosed insulating wall 86 is built after removal of the two masks 83 and 84 in a predetermined period of time. As an insulating layer (a semiconductor layer or a passivation layer, for example) is deposited thereafter, to manipulate a specific patterned mask 87 (as illustrated in top view diagram FIG. 13C) while deposition is proceeding (as illustrated in FIG. 13D), a specific conducting wall pattern 861 is formed on the substrate 81 after removal of the mask 87 in a predetermined of time. To complete process of TFT formation (as illustrated in FIG. 13E), liquid crystal is dropped and to enable to form a uniform liquid crystal layer 88. An UV sealant 89 is coated along periphery of the conductive wall 85 (as illustrated in top view diagram in FIG. 13F and cross-sectional view diagram in FIG. 13G). To pre-seal another substrate 82, then UV sealant 89 is exposed to UV light so as to be hardened as well as bonding substrate 81 and 82 together. Lastly an annealing process is executed to complete a liquid crystal display panel (as illustrated in FIG. 13H).

For the conductive wall 86 are bonded to the substrates 81 and 82, the liquid crystal layer 88 has no contact to the UV sealant 89 so as to avoid liquid crystal from contamination as well as degradation of display quality.

In addition, UV sealant 89 being exposed to UV light for hardening as well as for bonding the substrates 81 and 82, UV light is entirely blocked from any side of the substrates 81 and 82 for the enclosed conductive wall 86. (Gate metal layer or source/drain metal layer, for example, yet providing pixel electrode layer being ITO, merely conducting effect takes place instead of masking effect for it is light transmissive.) Thus degradation of liquid crystal is avoided as desired.

Also notice that conductive material (e.g. conductive adhesive or conductive spacer) is not required, for the conductive wall pattern formed on substrate 81 manages to conduct voltage from substrate 81 (i.e. TFT substrate) to another substrate 82 (i.e. CF substrate) as well as manages to support the structure.

Figure 14A:
FIGS. 14A to 14C illustrate another set of diagrams of formation of LCD according to one preferred embodiment of the present invention.
Figure 14B:
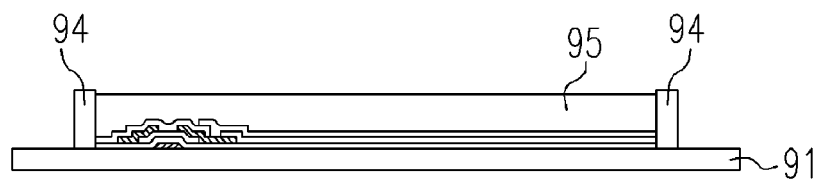
Figure 14C:
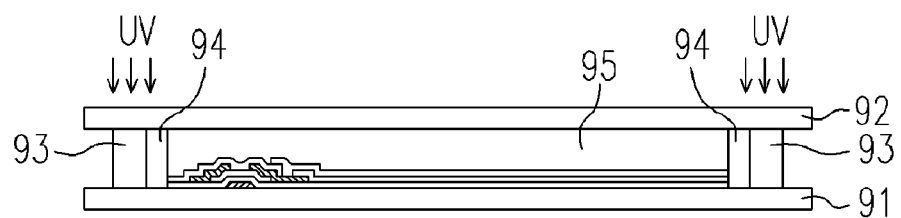

The Ninth Preferred Embodiment: According to the foregoing embodiments and referring to the FIGS. 14A to 14C, UV sealant 93 optionally coats one substrate 92 such that the UV sealant 93 is located outside of the formed conductive/insulating wall 94 (as illustrated in FIG. 14A) as being bonded to another substrate 91. That is, corresponding to TFT substrate 91. Liquid crystal is then dropped to the conductive/insulating wall 94 and to enable to form a uniform liquid crystal wall 95 (as illustrated in FIG. 14B). To pre-seal the two substrates 91 and 92, the substrate 92 and the substrate 91 are exposed to UV light so as to harden the UV sealant 93 as well as bonding the two substrates together. A last annealing process is performed and a liquid crystal display panel is thus completed thereby (as illustrated in FIG. 14C).

The shape and design of a mask (such as a photomask) described in this invention undoubtedly serves to be exemplary and is not necessarily limited to those in foregoing preferred embodiments. Manipulation of masks is automated by any automation equipment. The patterns on a mask serve to this design upon circuitry requirement, whereas the sealant (photo-sealant, e.g. UV sealant, IR sealant, or LASER sealant) also manages to bond to or to form space along with conductive/insulating wall. The formation of the conductive/insulating wall cooperates with any of the deposition steps that form TFT or pixel electrode, i.e. to form at least a single layer/wall (i.e. repeated formation of two or more layers/walls of conductive/insulating structure is possibly introduced). The forming steps, orders and materials arent limited to present invention, for example, to form a conductive/insulating layer on a conductive/insulating layer should be take as one step of forming a conductive/insulating layer, the conductive layer isnt limited to metal, the TFT forming process is not limited to specific masks process and so on.

The advantages of the present invention.

(1) To form the enclosed wall while to form either layer of TFT on the substrate so as to save additional cost of sealant forming process and material.

(2) Enabling to support and conduct without using additional conductive material such as conductive adhesive, conductive spacer and so on.

(3) To prevent the liquid crystal from deterioration caused by irradiation of UV light.

(4) To prevent the liquid crystal from contamination caused by contact with UV sealant.

(5) The liquid crystal can be formed on either one of the two substrates.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A liquid crystal display, comprising:
   two substrates, being spaced apart in parallel;
   an enclosed wall structure, provided in between said two substrates, wherein the enclosed wall structure and said two substrates form a first enclosed space, wherein said enclosed wall structure is not used for adhering said two substrates;
   a sealant, fanned outside said enclosed wall structure between said two substrates, wherein said sealant and said two substrates form a second enclosed space;
   a liquid crystal layer, formed in said first enclosed space between said two substrates; and
   at least a thin film transistor, being formed in said first enclosed space on one of said two substrates,
   wherein said enclosed wall structure comprises a conductive wall.

2. The liquid crystal display as recited in claim 1, wherein said conductive wall serves to conduct said two substrates.

3. The liquid crystal display as recited in claim 1, wherein said sealant comprises a light hardening adhesive.

4. The liquid crystal display of claim 1, wherein the sealant is formed only on the one of said two substrate with said enclosed wall.

5. A liquid crystal display, comprising:
   two substrates, being spaced apart in parallel;
   an enclosed wall structure, provided in between said two substrates, wherein the enclosed wall structure and said two substrates form a first enclosed space, wherein said enclosed wall structure is not used for adhering said two substrates;
   a sealant, formed outside said enclosed wall structure between said two substrates, wherein said sealant and said two substrates form a second enclosed space;
   a liquid crystal layer, formed in said first enclosed space between said two substrates; and
   at least a thin film transistor, being formed in said first enclosed space on one of said two substrates,
   wherein a plurality of conductive walls for conducting said two substrates are provided on said substrate that has said thin film transistors, wherein the conductive walls are located within the first enclosed space.

* * * * *